(12) United States Patent  (10) Patent No.: US 8,773,428 B2
Rolleston et al.  (45) Date of Patent: Jul. 8, 2014

(54) SYSTEMS AND METHODS FOR VISUALLY PREVIEWING VARIABLE INFORMATION 3-D STRUCTURAL DOCUMENTS OR PACKAGES

(76) Inventors: Robert John Rolleston, Rochester, NY (US); Barry G. Gombert, Rochester, NY (US)

( * ) Notice: Subject to any disclaimer, the term of this patent is extended or adjusted under 35 U.S.C. 154(b) by 407 days.

(21) Appl. No.: 13/155,645

(22) Filed: Jun. 8, 2011

(65) Prior Publication Data

US 2012/0313926 A1 Dec. 13, 2012

(51) Int. Cl.
*G06T 15/00* (2011.01)

(52) U.S. Cl.
USPC .......................................................... 345/419

(58) Field of Classification Search
CPC ......... G06T 15/00; G06T 17/50; G06T 17/00; G06T 19/00; G06T 17/20; G06T 15/10
See application file for complete search history.

(56) References Cited

U.S. PATENT DOCUMENTS

| | | |
|---|---|---|
| 3,902,655 A | 9/1975 | Huffman |
| 5,235,519 A | 8/1993 | Miura |
| 5,457,904 A | 10/1995 | Colvin |
| 5,513,117 A | 4/1996 | Small |
| 5,518,574 A | 5/1996 | Yates et al. |
| 5,687,087 A | 11/1997 | Taggart |
| 5,768,142 A | 6/1998 | Jacobs |
| 5,805,784 A | 9/1998 | Crawford |
| 5,881,538 A | 3/1999 | Blohm |
| 5,923,556 A | 7/1999 | Harris |
| 5,963,641 A | 10/1999 | Crandall et al. |
| 5,988,899 A | 11/1999 | Benson et al. |
| 6,046,818 A | 4/2000 | Benson et al. |
| 6,091,930 A | 7/2000 | Mortimer et al. |
| 6,092,054 A | 7/2000 | Tackbary et al. |
| 6,134,018 A | 10/2000 | Dziesietnik et al. |
| 6,134,568 A | 10/2000 | Tonkin |
| 6,153,039 A | 11/2000 | Jacobsen |
| 6,243,172 B1 | 6/2001 | Gauthier et al. |
| 6,327,050 B1 | 12/2001 | Motamed et al. |
| 6,332,149 B1 | 12/2001 | Warmus et al. |
| 6,616,702 B1 | 9/2003 | Tonkin |
| 6,687,016 B2 | 2/2004 | Gauthier |

(Continued)

FOREIGN PATENT DOCUMENTS

| | | |
|---|---|---|
| JP | 9161097 | 6/1997 |
| JP | 2004029471 | 1/2004 |
| JP | 2004164151 | 6/2004 |
| JP | 2004-005513 | 8/2004 |

OTHER PUBLICATIONS

U.S. Appl. No. 12/163,219, filed Jun. 27, 2008, Pouyadou.

(Continued)

*Primary Examiner* — Kee M Tung
*Assistant Examiner* — Frank Chen
(74) *Attorney, Agent, or Firm* — Fay Sharpe LLP

(57) ABSTRACT

Systems and methods are presented for previewing 3-D images of produced 3-D variable information structural documents or packages in which still images and/or animations are provided showing the text, data, graphics and/or images of 3-D structural documents or packages defined by a variable information print job file allowing a user to preview the produced 3-D structural documents or packages as a sequence of still images and/or as animations showing different forms of the 3-D produced structures.

20 Claims, 11 Drawing Sheets

(56) References Cited

U.S. PATENT DOCUMENTS

| | | |
|---|---|---|
| 6,771,387 B2 | 8/2004 | Gauthier |
| 6,896,250 B2 | 5/2005 | Hillebrand |
| 6,948,115 B2 | 9/2005 | Aizikowitz et al. |
| 6,953,513 B1 | 10/2005 | Volkert |
| 6,973,363 B2 | 12/2005 | Masumoto et al. |
| 7,172,113 B2 | 2/2007 | Olenick et al. |
| 7,236,258 B2 | 6/2007 | Wen et al. |
| 7,406,194 B2 | 7/2008 | Aizikowitz et al. |
| 7,577,902 B2 | 8/2009 | Hong et al. |
| 7,765,469 B2 | 7/2010 | Sembower et al. |
| 7,788,883 B2 | 9/2010 | Buckley et al. |
| 7,832,560 B2 | 11/2010 | Tilton |
| 2002/0010721 A1 | 1/2002 | Crimmins, Jr. et al. |
| 2002/0114004 A1 | 8/2002 | Ferlitsch |
| 2002/0116439 A1 | 8/2002 | Someshwar et al. |
| 2002/0171871 A1 | 11/2002 | Catt et al. |
| 2003/0035138 A1 | 2/2003 | Schilling |
| 2003/0140315 A1 | 7/2003 | Blumberg et al. |
| 2003/0189726 A1 | 10/2003 | Kloosterman et al. |
| 2004/0066527 A1 | 4/2004 | Kloosterman et al. |
| 2004/0066537 A1* | 4/2004 | Youden ................ 358/1.16 |
| 2004/0111418 A1 | 6/2004 | Nguyen et al. |
| 2005/0174349 A1 | 8/2005 | Watson |
| 2005/0278614 A1 | 12/2005 | Aizikowitz et al. |
| 2005/0278621 A1 | 12/2005 | Aizikowitz et al. |
| 2006/0114490 A1 | 6/2006 | Rolleston |
| 2006/0133664 A1 | 6/2006 | Hong et al. |
| 2006/0217831 A1 | 9/2006 | Butterworth et al. |
| 2006/0284360 A1 | 12/2006 | Hume et al. |
| 2007/0041035 A1 | 2/2007 | Sembower et al. |
| 2007/0240042 A1 | 10/2007 | Sato |
| 2007/0255139 A1 | 11/2007 | Deschinger et al. |
| 2007/0268513 A1 | 11/2007 | Enloe |
| 2009/0070213 A1 | 3/2009 | Miller et al. |
| 2009/0222724 A1 | 9/2009 | Stewart et al. |
| 2010/0060909 A1 | 3/2010 | Conescu et al. |
| 2010/0098319 A1 | 4/2010 | Gombert et al. |
| 2010/0100214 A1* | 4/2010 | MacDonald ................ 700/97 |
| 2010/0214598 A1 | 8/2010 | Hoppenot et al. |

OTHER PUBLICATIONS

Xerox, Xerox Mobile Express Driver: Free Universal Printer Driver:, available at http://www.office.xerox.com/software-solutions/mobile-printer-driver, copyright 1999-2009, downloaded Feb. 3, 2009.

Fuji, "Fujifilm XMF", available at http://www.fujixmf.com/, copyright 2007, downloaded Feb. 3, 2009.

FFEi, "RealVue3D" available at: http://www.realvue3d.com/, copyright 2008, downloaded Feb. 3, 2009.

IBM Visual Job Ticketing, IBM Printing Systems; c. IBM Corporation 2002.

Dreamworks = hp web page; http:/welcome.hp.com/country/us/en/msg/corp/flashdreams.html; c. HP Development, L. P.; Dec. 1, 2004; 1 page.

The new iPhoto web page; http:/www.apple.com/ilife/iphoto; c. 2004 Apple Computer, Inc., Dec. 1, 2004; 3 pages.

Mimeo—Your Online Print Center web page; http://www.mimeo.com/demo.htm; 1-800-Go Mimeo; c. 2001 Mimeo.com; Dec. 1, 2004.

Mimeo—Your Online Print Center webpage; http://ww.mimeo.com/enterprise/features.htm; 1-800-466-4636; c. 1999-2004 Mimeo, Inc; Dec. 1, 2004; 4 pages.

\* cited by examiner

SYSTEMS AND METHODS FOR VISUALLY PREVIEWING VARIABLE INFORMATION 3-D STRUCTURAL DOCUMENTS OR PACKAGES

BACKGROUND AND INCORPORATION BY REFERENCE

The exemplary embodiments relate to apparatus and techniques allowing users to view a three-dimensional (3-D) virtual representation of variable information 3-D structural documents or packages. Variable information print jobs are used in a variety of situations in which multiple printed documents or packages are to be created with fully or partially individualized content. For example, variable information print jobs are used in creating individualized advertisements for mass mailings, wherein the recipient's name and address are different for each printed article, while certain information is common to each printed document or package. Individualized graphics may also be used, for example, were pictures or images of specific products are included on particular advertisements addressed to recipients who are expected to have interest in those products. Variable information print jobs are also used in business related mailings, such as incorporation of particularized customer information into utility bill mailings, incorporation of recipient-specific account data in quarterly banking statements, etc. In this regard, the variable information print job can be described by a print job file that defines text, data, graphics and/or images that will appear on the printed articles, some of which is particularized for a given article.

Structural printed documents or packages (3-D structural documents or packages) are printed articles which have a modifiable three-dimensional form, such as greeting cards that are printed in a flat position and are subsequently folded for insertion into a mailing envelope. Other examples include product boxes, such as for food packaging with printed content on one or more sides. Certain attributes of 3-D structural documents or packages may be specific to the printed content. For example, one or more dimensions of a folded greeting card are determined by the text of a recipient's name or packages for certain food products may have one or more dimensions that vary according to a particular product to be inserted into the package.

3-D structural documents or packages may be created as part of a variable information print job, with text, data, graphics and/or images being particularized for individual items within a large group. Prior to initiating a variable information print job for creating multiple 3-D structural documents or packages, it is desirable to ensure that the prospective produced 3-D structural documents or packages will be what is expected. This is particularly true where a large number of documents or packages are to be produced and/or where the print job is to be performed at and off-site production facility. Recently, Web-to-Print print tools have been provided, which allow a user to direct a print job to off-site production print facilities via the Internet, for instance, to send a high-volume print job to an external printing vendor with lower cost and/or better availability of printing and finishing options than are available in the user's enterprise or organization. Prior to sending a variable information print job off-site for creating produced 3-D structural documents or packages, however, the user would prefer to have a high degree of confidence that the finished articles will look as expected. Document visualization techniques have been proposed in which the user is provided with a two-dimensional view of the document, but these review tools and techniques do not provide a high level of confidence in reference to 3-D variable information structural document or package print jobs. 3-D previewing systems have been proposed in which the user is presented with a movable object view of a single item print job, but these do not provide the ability to easily preview the variation in content, size and/or shape from item to item for variable information print jobs. Thus, improved techniques are desirable to provide users with confidence in finished product quality for produced 3-D variable information structural documents or packages prior to submission of associated print jobs.

U.S. Patent Application Pub. No. 2003/0035138, published Feb. 20, 2003, entitled INTERNET-BASED CUSTOM PACKAGE-PRINTING PROCESS, to Schilling, discloses processes for package customers to control package selection, design, shipping and payment decisions via the Internet for electronically placing and filling customized package orders, the entirety of which printed publication is hereby incorporated by reference.

U.S. Patent Application Pub. Nos. 2005/0278614 and 2005/0278621, published Dec. 15, 2005, entitled SYSTEM AND METHOD FOR EFFICIENT PRODUCTION OF DYNAMIC DOCUMENTS, to Aizikowitz et al., disclose production of dynamic documents including producing variable information PDL (VIPDL) output streams from a dynamic document and a recipients list, the entireties of which are hereby incorporated by reference.

U.S. Patent Application Pub. No. 2010/0098319, published Apr. 22, 2010, entitled METHOD AND SYSTEM FOR THE PRODUCTION OF VARIABLE-DIMENSIONAL PRINTED SUBSTRATES, to Gombert et al., discloses a system and method for generating customized printed 3-D objects, the entirety of which printed publication is hereby incorporated by reference.

U.S. Patent Application Pub. No. 2006/0114490, published Jun. 1, 2006, entitled SYSTEM AND METHOD FOR DOCUMENT PRODUCTION VISUALIZATION, to Rolleston, discloses a system and method for pre-print visualization of a job to be printed. The entirety of this printed publication is hereby incorporated by reference.

U.S. Pub. No. 2007/0268513, published Nov. 22, 2007, entitled METHOD AND SYSTEM FOR PRINT PRODUCTION CONFLICT VISUALIZATION, to Enloe, discloses a method for document print production conflict visualization and resolution. This publication is hereby incorporated by reference in its entirety. A document and a job ticket for printing are selected, with the job ticket including various document publishing requirements. Conflict analysis is performed to identify at least one conflict among the document publishing requirements and a visualization of each identified conflict is sequentially presented on a user interface. The visualizations utilize graphical clues, superimposed upon the rendering of a 3-D model of the document, to clearly illustrate the nature of each problem, and sequentially show how each available suggested solution would resolve the conflict. The user interface requests approval to proceed with problem resolution if a conflict is identified among the publishing requirements or indicates that no conflict is present.

U.S. patent application Ser. No. 13/026,435, entitled METHOD AND SYSTEM FOR PROVIDING A THREE-DIMENSIONAL PREVIEW OF A FINISHED DOCUMENT, filed Feb. 14, 2011 to Dangler, et al. describes three-dimensional previewing a finished document based on a key feature analysis, in which the document is analyzed by a document analysis algorithm configured in association with a document visualization module in order to identify a number of key features associated with the document. A viewing script is created with respect to the key features, and a document-specific visual animation of the key features is displayed based on the viewing script at a user interface in order to preview the finished document. The entirety of this patent application is hereby incorporated by reference.

U.S. Pat. Nos. 6,134,568 and 6,616,702, both to Tonkin, are directed to selecting components for assembly of a document, and previewing a simulation of an assembled document prior to physical assembly. The entireties of these patents are hereby incorporated by reference.

U.S. Pat. Nos. 6,948,115 and 7,406,194, both to Aizikowitz et al., are directed to efficiently producing dynamic documents including production of VIPDL output streams from a dynamic document and a recipients list, the entireties of which patents are hereby incorporated by reference.

BRIEF DESCRIPTION

Processor-based systems and techniques are presented for previewing three-dimensional (3-D) images of produced 3-D variable information structural documents or packages, which can be advantageously employed to facilitate user preview prior to submission of potentially lengthy and/or costly print jobs for such printed articles.

In accordance with one or more aspects of the present disclosure, a system is disclosed, which includes at least one processor and a memory that stores 3-D models of a plurality of produced 3-D structural documents or packages. The models in certain embodiments are created by an included 3-D model generation component. The produced articles include text, data, graphics and/or images defined by a corresponding plurality of data records of a variable information print job file, such as a VIPDL file. The system includes a buffer that stores image data received from the processor and provides stored image data to a separate or included user interface. The system also includes a rendering component that renders image views of the 3-D models individually representing some or all of the produced 3-D structural documents or packages, where the rendering and/or the provision of stored image data to the user interface are done at least partially according to one or more record selection control signals or values.

In certain embodiments, the stored image data is provided from the buffer as a plurality of image views based on the record selection control input, where the record selection control can identify a specific data record of the variable information print job file and/or may increment or decrement the provided image view of a predefined sequence of such views, thereby allowing a user to easily navigate through previews of a large number of variable information documents or packages.

The rendering component in certain embodiments is operative to render the image views from the perspective of a view position determined at least partially according to one or more view position control signals or values received from the user interface. In some embodiments, moreover, the rendering component renders the image views representing a given 3-D form of the produced 3-D structural document or package, with the given 3-D form determined according to at least one 3-D form control signal or value.

Animation is provided in certain embodiments, moreover, in which two or more image views are rendered which represent different 3-D forms of a corresponding produced structural document or package, where the buffer provides the stored image data including the two or more image views as an animation. In certain embodiments, the rendering component renders these image views based at least in part on an animation control signal or value from the user interface, and the 3-D model(s) corresponding to the animation is/are determined according to the record selection control signal or value. Moreover, the two or more image views in certain embodiments are rendered from the perspective of a view position determined at least in part according to a view position control signal or value from the user interface.

A method is provided in accordance with further aspects of the present disclosure for previewing 3-D images of produced 3-D variable information structural documents or packages. The method includes receiving a variable information print job file having a plurality of data records defining text, data, graphics and/or images for a plurality of 3-D structural documents or packages, and creating 3-D models of a plurality of produced 3-D structural documents or packages at least partially based on the variable information print job file. The method further includes receiving one or more record selection control signals or values, and rendering image views of the 3-D models that individually represent one, some, or all of the produced 3-D documents. The image views are stored in a buffer, and stored image data is provided from the buffer to a user interface, where one or both of the rendering and image data providing are done at least partially according to the record selection control signals or values.

Certain embodiments of the method include rendering two or more image views of a given 3-D model according to a corresponding data record of the print job file, where the image views represent different 3-D forms of the corresponding produced 3-D structural document or package, as well as providing stored image data from the buffer to the user interface including the two or more image views as an animation. Certain embodiments include receiving one or more record selection control signals or values from the user interface identifying a specific data record of the print job file, and providing image views identified by the record selection control signals or values to the user interface. In certain embodiments, moreover, the method includes receiving at least one view position control signal or value, and rendering the image views from the perspective of a view position determined in whole or in part according to the view position control signals or values. Certain embodiments of the method include receiving at least one 3-D form control signal or value, and rendering the image views representing a given 3-D form of the produced 3-D document determined according to the form control signal or value.

Tangible computer-readable media are provided in accordance with further aspects of the present disclosure, which include computer-executable instructions for receiving a variable information print job file with records defining text, data, graphics and/or images for a plurality of 3-D structural documents or packages, creating 3-D models of produced 3-D structural documents or packages at least partially according to the print job file, receiving one or more record selection control signals or values, and rendering image views of the 3-D models individually representing at least some of the produced 3-D documents. The computer-readable medium further includes computer-executable instructions for storing the image views in a buffer, and providing stored image data from the buffer to a user interface, where the image views are rendered and/or the stored image data is provided to the user interface at least partially according to one or more record selection control signals or values.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
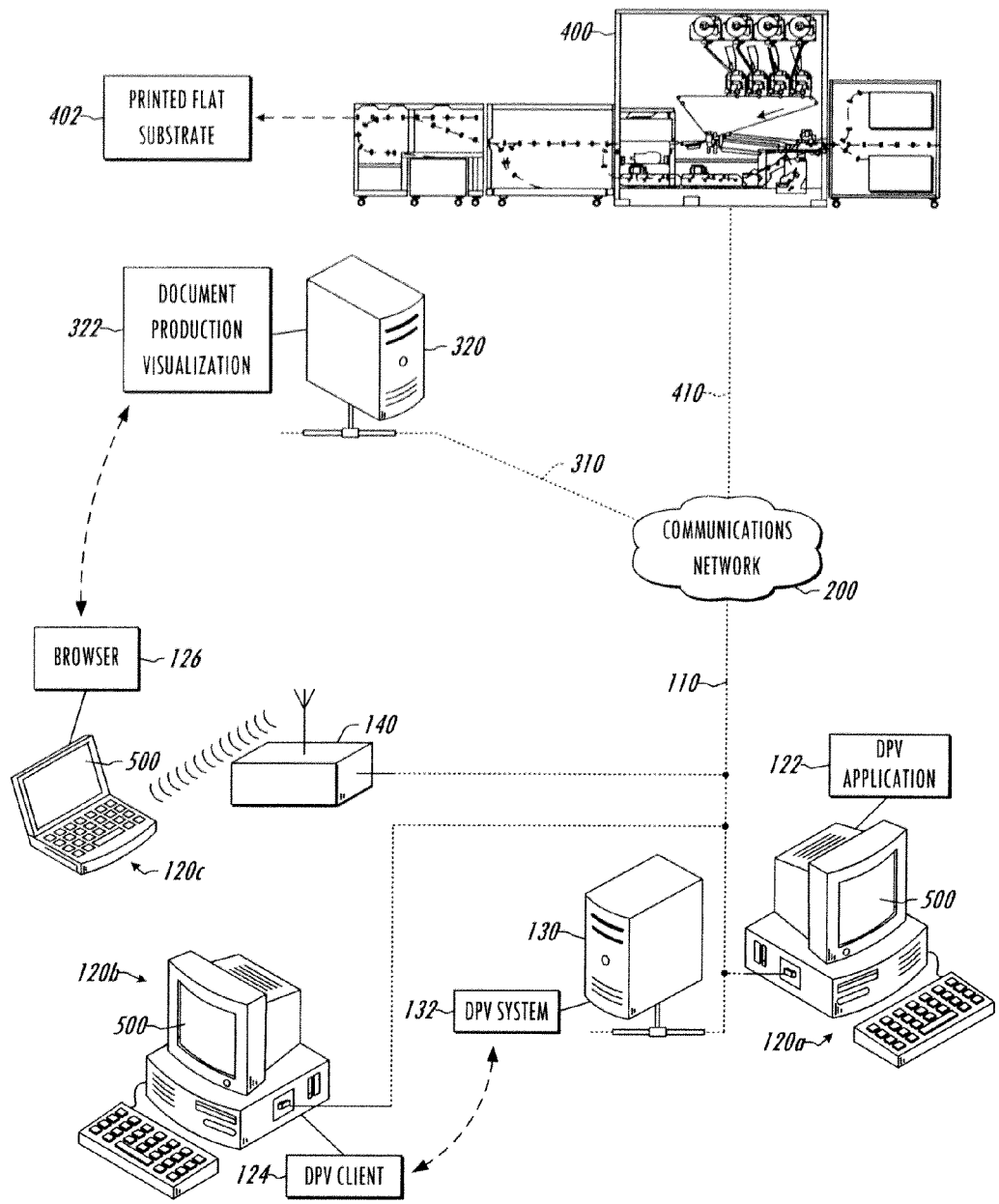
FIG. 1 is a system diagram illustrating an exemplary processing environment in which one or more aspects of the present disclosure may be carried out, with an Internet-based document production visualization system accessible via a browser, a client-server implementation of a document production visualization system, and a document production visualization application implemented in a user computer for previewing 3-D images of produced 3-D variable information structural documents or packages in accordance with one or more aspects of the disclosure.

Several embodiments or implementations of the different aspects of the present disclosure are hereinafter described in conjunction with the drawings, wherein like reference numerals are used to refer to like elements throughout, and wherein the various features, structures, and graphical renderings are not necessarily drawn to scale.

The present disclosure presents systems and methods for preview of 3-D images of produced variable information structural documents or packages that can be advantageously employed to allow users to review and obtain a level of confidence in finished product quality for produced 3-D variable information structural documents or packages prior to print job submission. Embodiments of the disclosed techniques and systems facilitate preview of a finished 3-D graphical content for some or all records in a variable data job, which can be combined with animations (e.g., bending, opening/closing, etc.) for finished 3-D structural documents such as greeting cards, promotional materials, etc., and/or packaging. In certain implementations, a VIPDL file or other variable information print job file includes a number of records corresponding to individual finished 3-D structural documents or packages, and a user can manually select variable information records for preview or these can be automatically iterated. Animations can be provided showing different three-dimensional forms of the finished printed documents or packages, which can be paused or otherwise adjusted by the user. The viewed images and/or animations can be modified through orbit, pan, and/or zoom operations by which the user can set a view position, and the preview is automatically adjusted to portray different structural document or package dimensions as these vary according to the selected record. The presently disclosed concepts may be advantageously employed to facilitate a user previewing an entire set of resulting produced 3-D structural documents or packages, or a subset thereof, allowing independent inspection of different attributes of the produced articles such as spatial structure, folding operation, graphical content, etc., and allowing inspection from any desired view position, angle, distance, etc.

FIG. 1 illustrates an exemplary networked computer environment including several user computers 120 and a server 130 operatively interconnected with one another via a network 110, with a wireless network transceiver interface 140 providing connectivity for a portable computer 120c to access the network 110. The computers 120 of the network 110 can also communicate with other networks 310, 410 by way of an intermediate communications network 200, such as the Internet, where variable network gateways another interconnection apparatus may be provided (not shown). Users of the computers 120 can access, execute, or otherwise interact with a document production visualization (DPV) system by way of the computer 120 and a user interface 500 thereof in order to preview 3-D images 512 of produced 3-D variable information structural documents or packages as described further below. As seen in the computing environment of FIG. 1, the preview system can be implemented as a standalone document production visualization application 122 on a user computer 120a, as a program 132 running on a server 130 accessed via client software 124 running on a user computer 120b, and/or as a program 322 running on the server 320 accessible via a browser 126 running on a user computer 120c.

Figure 2:
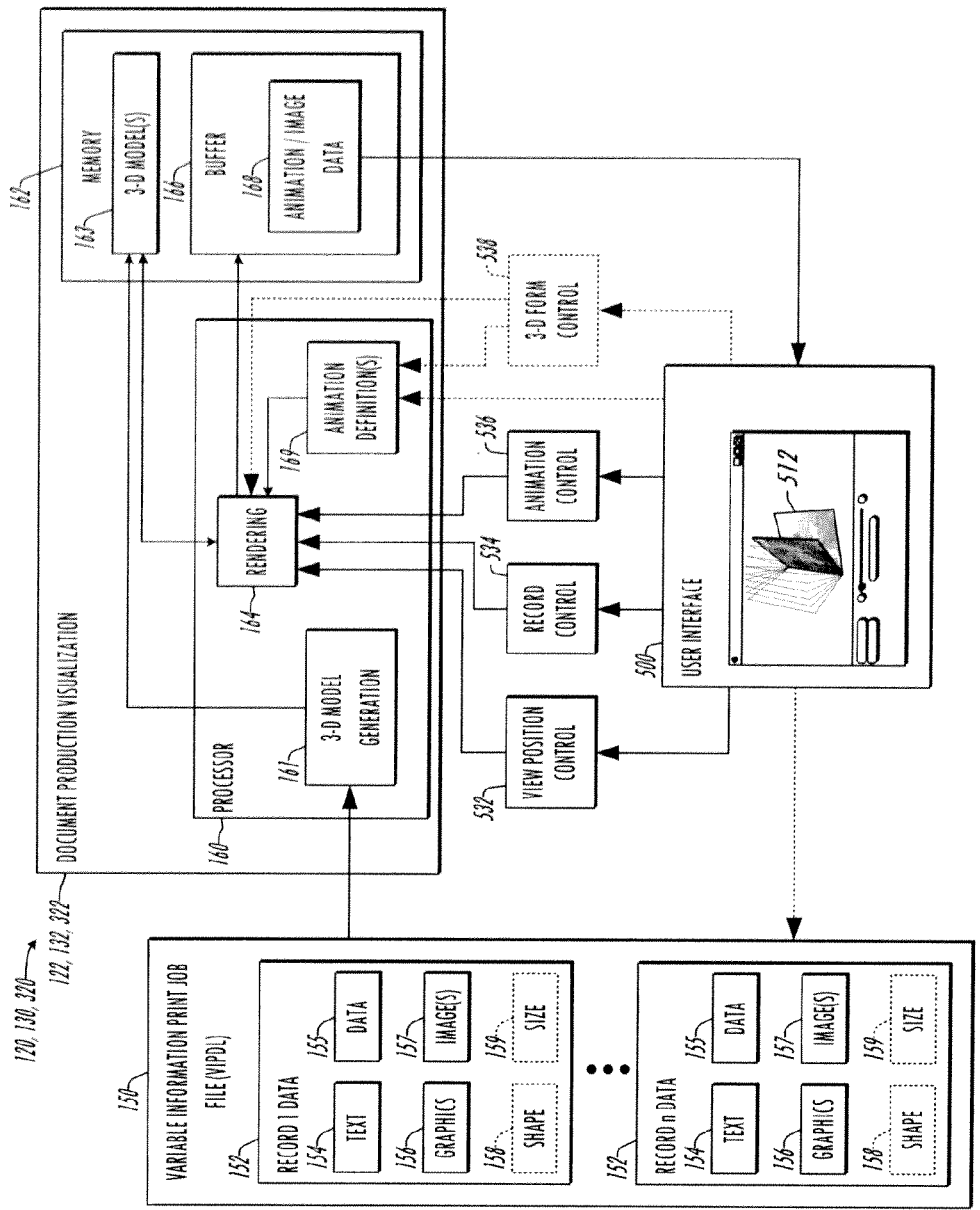
FIG. 2 is a schematic diagram illustrating further details of an exemplary document production visualization system with a processor and memory operatively coupled with a user interface, as well as an exemplary variable information print job file with multiple data records corresponding to individual produced structural documents or packages.

Referring also to FIG. 2, the document production visualization system 122, 132, 322 can be implemented as a processor-based system having a processor 160 operatively coupled with a memory 162, where any suitable processing component or components can be used, including without limitation microprocessors, microcontrollers, programmable logic, analog circuitry, and/or combinations thereof, and the various components and functionality of the system 122, 132, 322 can be implemented in a single processing device 160 or may be implemented in distributed fashion among a plurality of processing elements. In the embodiment illustrated in FIG. 2, the processor implements a 3-D model generation component 161 as well as a rendering component 164 and an animation definitions component 169. The various components 161, 164 and/or 169 can be implemented, for example, as computer-executable instructions stored in the memory 162 or other non-transitory computer-readable medium (e.g., CD-ROM, flash memory, disk drive, etc.) with the instructions being executed by the processor 160.

The memory 162 in this example provides storage for a plurality of 3-D models 163 as well as a buffer 166 for storing animation and/or image data 168 from which image views 512 are provided to a user interface 500 for rendering to a user, for instance, by way of a graphical display. The system 122, 132, 322 may include the user interface 500, for instance, where the system is a document production visualization application 122 running on a user computer 120a (FIG. 1) that includes the user interface 500 by which a user can preview produced 3-D variable information structural documents and/or packages prior to actual production of these articles. In other possible implementations, the user interface 500 is separate from the DPV system 122, 132, 322, such as where the system 322 is hosted by a server 320 coupled with an external network 310, with the user accessing the system 322 using a browser 126 and a user interface 500 of a separate user computer 120c operatively coupled with the network 110 via the wireless router 140. In another possible embodiment, the DPV system 132 is executed on the server 130 associated with the network 110, with a user accessing the system 132 using DPV client software 124 and a user interface 500 of a separate user computer 120b.

In operation, a user of one of the computers 120 may prepare a variable information print job file, such as a variable information PDL (VIPDL) file 150 that includes a plurality of data records 152, each of which corresponds to an instance of a separate structural document or package to be printed as part of a variable information print job. Ultimately, the user will submit or otherwise provide the print job file 150 directly or indirectly to a print production system 400 (FIG. 1) for printing a plurality of structural documents or packages 402, where these are initially printed as flat substrates, and thereafter may be folded or otherwise formed into a three-dimensional structure. Examples include foldable greeting cards, packages or containers (e.g., boxes), etc. which can be modified to take on multiple physical forms. In the example of FIG. 1, the production facility 400 is operatively coupled with the Internet communications network 200 by way of a network connection 410, although the variable information print job file 150 can be provided to one or more such production facilities 400 by any suitable means.

Figure 6:
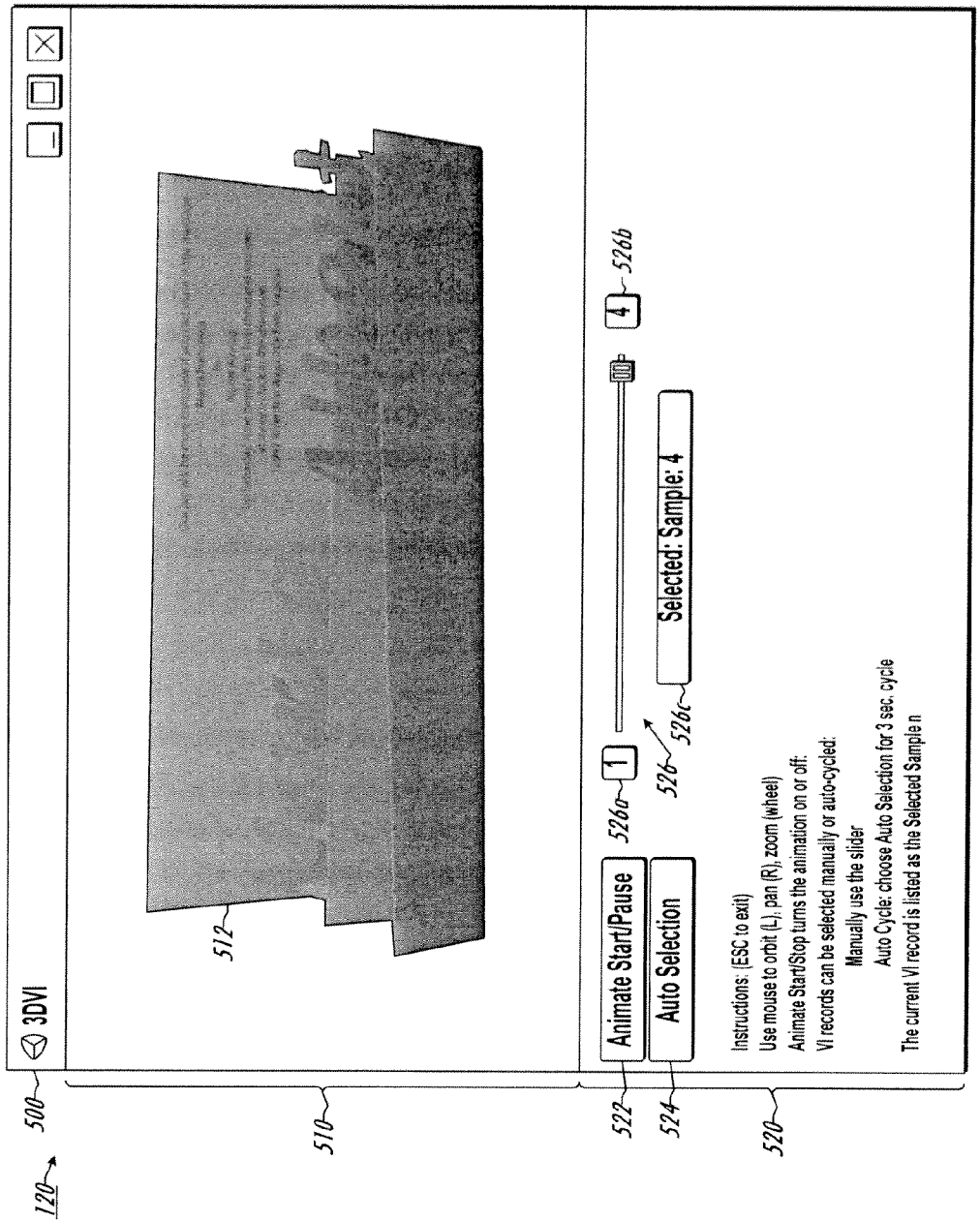
FIG. 6 illustrates the graphical user interface displaying a 3-D rendering of another foldable greeting card type 3-D structural document with size, shape, text and graphics tailored according to a recipient name.

As best seen in FIG. 2, the print job file 150 defines one or more of text 154, data 155, graphics 156 and/or images 157 for each record 152, by which a potentially large number of printed three-dimensional structural documents and/or packages can be produced, typically with one or more of the printed articles 402 having common printed elements, and with one or more of the text 154, data 155, graphics 156 and/or image(s) 157 being particular to a given record 152. This, in turn, allows definition of print jobs for high volume advertisements with certain content particularized for a given recipient by tailoring the content of the data records 152 accordingly. In addition, the variable information of the individual data records 152 can also specify a particularized shape 158 and/or size 159 of the produced printed article. For instance, the shape 158 may be defined by a target recipient's name as seen in FIG. 6 below, and the size of the printed article 402 may likewise be affected by particularized content such as the text corresponding to the recipient's name.

The user interface 500 can be any suitable means by which a user can interact with the DPV system 12, 132, 322 for previewing 3-D images 512 of produced 3-D variable information structural documents or packages, including the visual display means (e.g., a graphical display) and may provide means for receiving user inputs, including without limitation mouse or other pointing device, keyboard, voice activation input system, etc., as well as additional output means such as a display, speakers, etc. In the illustrated embodiment, the user interface 500 can be operated by a user to provide various control inputs to the system 122, 132, 322. Among these are view position control signals or values 532 with which a user can specify a view position from which the image views 512 are rendered on the graphical display, one or more record selection control signals or values 534 for specifying a particular one of the data records 152 and/or a particular corresponding one of the image views 512, one or more animation control signal or value inputs 536 by which a user can manipulate and control operation of a displayed animation of a produced structural document or package, as well as optional 3-D form control input signals or values 538 by which a user can set the physical form of a produced structural document or package for 3-D image previewing.

In operation, the document production visualization system 122, 132, 322 receives or is otherwise provided operational access to the variable information print job file 150, and uses the data records 152 thereof to generate a plurality of 3-D models 163 by way of a 3-D model generation component 161 implemented by the processor 160. The model generation component 161 receives the print job file 150, generates the 3-D models 163 of a plurality of produced 3-D structural documents or packages defined by the data records 152, and stores the models 163 in the memory 162. The rendering component 164 uses the generated 3-D models 163 to render image views 512, where the rendered image views 512 represent one, some, or all of the plurality of produced 3-D structural documents or packages, and stores the image views 512 in the buffer 166 in the form of animation/image data 168.

The rendering component 164 in certain embodiments generates an animation as a series of two or more image views 512 of a given 3-D model 163 representing a corresponding given produced 3-D structural document or package according to a corresponding data record 152, where the image views 512 represent different 3-D forms of the corresponding structural document or package. The different 3-D forms in certain embodiments are defined by the animation definitions 169, which in turn can be set according to the 3-D form control input 538 from the user interface 500 allowing a user to define which structural document or package forms they desire to view in an animated fashion. For instance, the user interface 500 may allow the user (through suitable prompting an input means) to set the order of assembly of a box package structure, the order of folding of a map, etc. The buffer 166 provides the stored image data 168 to the user interface 500 including the two or more image views 512 as an animation, and the user interface 500 may be operated by the user via animation control inputs 536, for instance to set a range of animated viewing, to start and/or pause the animation, etc.

During animated or still view previewing, the user can use the view position control inputs 532 by operating various input features of the user interface 500 in order to perform various view position adjustment tasks, including without limitation orbit control, pan control, zoom operations, etc. Moreover, the animation definitions 169 may define animation parameters to be used for a series of different rendered articles, with the user being able to provide record selection control inputs 534 in order to quickly navigate through a series of animations of produced articles corresponding to different records 152 of the print job file 150.

Referring also to FIGS. 3-6, FIG. 3 illustrates an exemplary graphical user interface 500 with a display region 510 in which image views 512 are rendered. The interface 500 further includes a control portion 520, in this example including an animation start/pause control 522, as well as record selection controls 524 and 526. The animation control 522 is a clickable visual indicia on the graphical display of the user interface 500 which can be operated by keyboard, mouse, voice activation control, etc. in order to toggle the current animation between a play condition and a stop condition. The user interface 500 may be further provided with additional user-actuatable control indicia for generating animation control signals and/or values 536, including without limitation/reverse controls, repeat controls, animation range-setting controls, controls for modifying the 3-D form of the structural document/package being animated (e.g., order of folding structural elements, identification of elements to be folded, degree of folding, etc.), slide controls for advancing the animation position, etc. (not shown).

Figure 3:
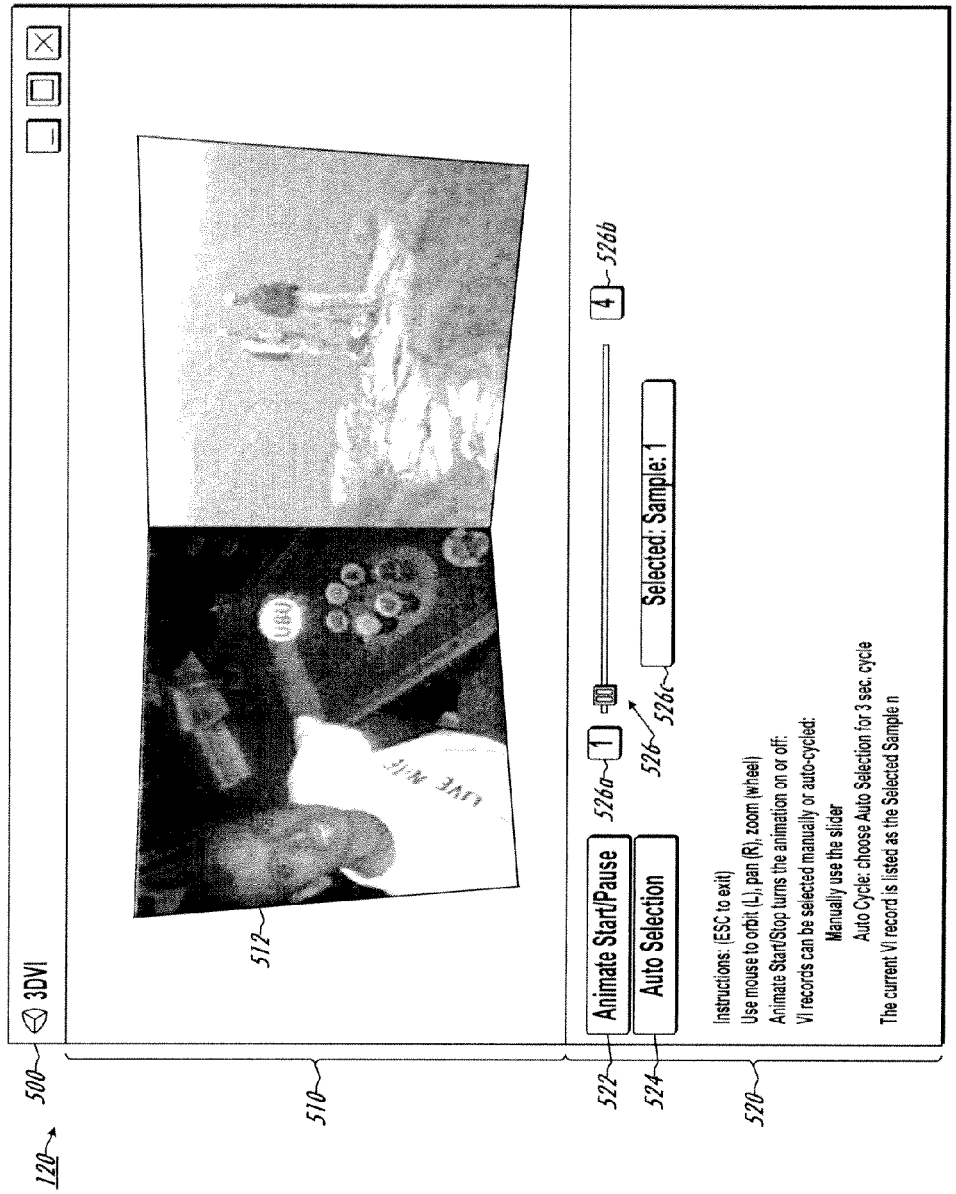
FIG. 3 is a simplified partial front elevation view illustrating an exemplary graphical user interface with user controls displaying a 3-D rendering of an exemplary foldable greeting card type 3-D structural document with images and text particularized to a specific recipient according to a first record of a variable information print job file.

The control 524 in one example sets the record selection between a first mode in which the current record 152 is automatically selected, for example in a sequence in which the system 122, 132, 322 incrementally renders images 512 of each corresponding structural document/package for a given time period, which can be defined to advanced through all the records 152 or a predefined or user-selectable subset thereof, and a second mode in which the user can identify a particular data record 152 for rendering using the controls 526. In the embodiment of FIG. 3, a first visual indicia 526a indicates an integer number "1" identifying the number of the first record 152 in the predefined sequence, and an indicia 526b shows the number of the last record 152 of the sequence, in this case the fourth record "4". In addition, a slidable indicia is provided on a horizontal slide bar indicia, which the user can manipulate using a mouse or other pointing device to set the currently selected record 152 in the predefined sequence, with a textual indicia 526c indicating the currently selected record number (e.g., "Sample: 1" in the figure).

By this operation, the record selection control signals or values 534 may specifically identify a data record 152 of the print job file 150 to the rendering component 164 (and/or may specifically identify a previously generated image view 512 for use by the buffer 166 to provide this to the user interface 500), such that the buffer 166 provides the corresponding image views 512 identified by the record selection control signals or values 534 to the user interface 500. In other possible embodiments, the record selection control signal or value 534 indicates an increment or decrement command relative to a currently selected record 152, with the buffer 166 providing the image views 512 corresponding to data records 152 of the print job file 150 in a full or user-defined or predefined sequence to the user interface 500 according to the increment/decrement commands indicated by the record selection control signals or values 534.

The illustrated control portion 520 of the user interface 500 further includes textual instructions indicating to the user how the view position may be set or modified. In this case, a mouse or other pointing device can be used for orbit control (left mouse button in conjunction with mouse movement) to cause the view to orbit around the object, pan control (right mouse button combined with mouse movement) to cause the view to pan left or right, as well as up or down relative to the object, and/or zoom control (rotation of a mouse wheel) to move the image 512 closer or farther away. Operation of the pointing device in this fashion causes generation by the user interface 500 of one or more view position control signals or values 532 which are provided to the document production visualization system 122, 132, 322.

In the illustrated embodiment, the rendering component 164 operates according to the various control inputs 532, 534, 536 and/or 538 from the user interface 500 and according to the animation definitions 169 to selectively render the desired image views 512 of the 3-D models 163 according to the records 152 of the variable information print job file 150, and stores the rendered image views 512 in the animation/image data 168 of the buffer 166. Thus, when the user modifies the view position control inputs 532, the record selection control inputs 534, the animation control inputs 536 and/or the 3-D form control inputs 538, the rendering component 164 may generate new image views 512 using the models 163, and store the newly created image views 512 in the buffer 166 for provision to the user interface 500. In this regard, the record selection control signal or value 534 may be used by the rendering component 164 to select the corresponding 3-D model or models 163 used for rendering image views 512. With respect to animation operation, the model generation component 161 may create separate models 163 corresponding to different 3-D forms, with the rendering component 164 utilizing the separate models 163 for generation of corresponding image views 512 for an animation presentation, with the buffer 166 providing the corresponding image views 512 to the user interface 500.

In other possible implementations, the rendering component 164 can generate all possible image views 512 (or a large number of potential image views 512) and store these in the buffer 166, with the various control inputs 532, 534, 536 and/or 538 being used by the buffer 166 or a component of the system 122, 132, 322 that controls operation of the buffer 166, in order to selectively provide the selected image views 512 to the user interface 500 according to these inputs. In this manner, the provision of stored image data 168 to the user interface 500 and/or the rendering of image views 512 of the 3-D models 163 is done at least partially according to one or more of the inputs 532, 534, 536, 538. In particular, the record selection control signals or values 534 can be used by either or both of the rendering component 164 and/or the buffer 166 (or component that operates the buffer 166) to provide the user with the ability to selectively preview the 3-D images 512 of produced 3-D variable information structural documents or packages as defined by the variable information print job file 150.

As seen in FIG. 3, the exemplary initial record 152 defines a foldable greeting card having a single central fold line, where the figure illustrates first and second photos or images in the interior of the structure (e.g., a greeting card), with defined text 154 ("UBU") superimposed over the image on the left in FIG. 3. In this case, the first photograph shows a user-supplied photo of the recipient of the card, and the next photo shows a picture of the recipient and the sender on vacation.

Figure 4:
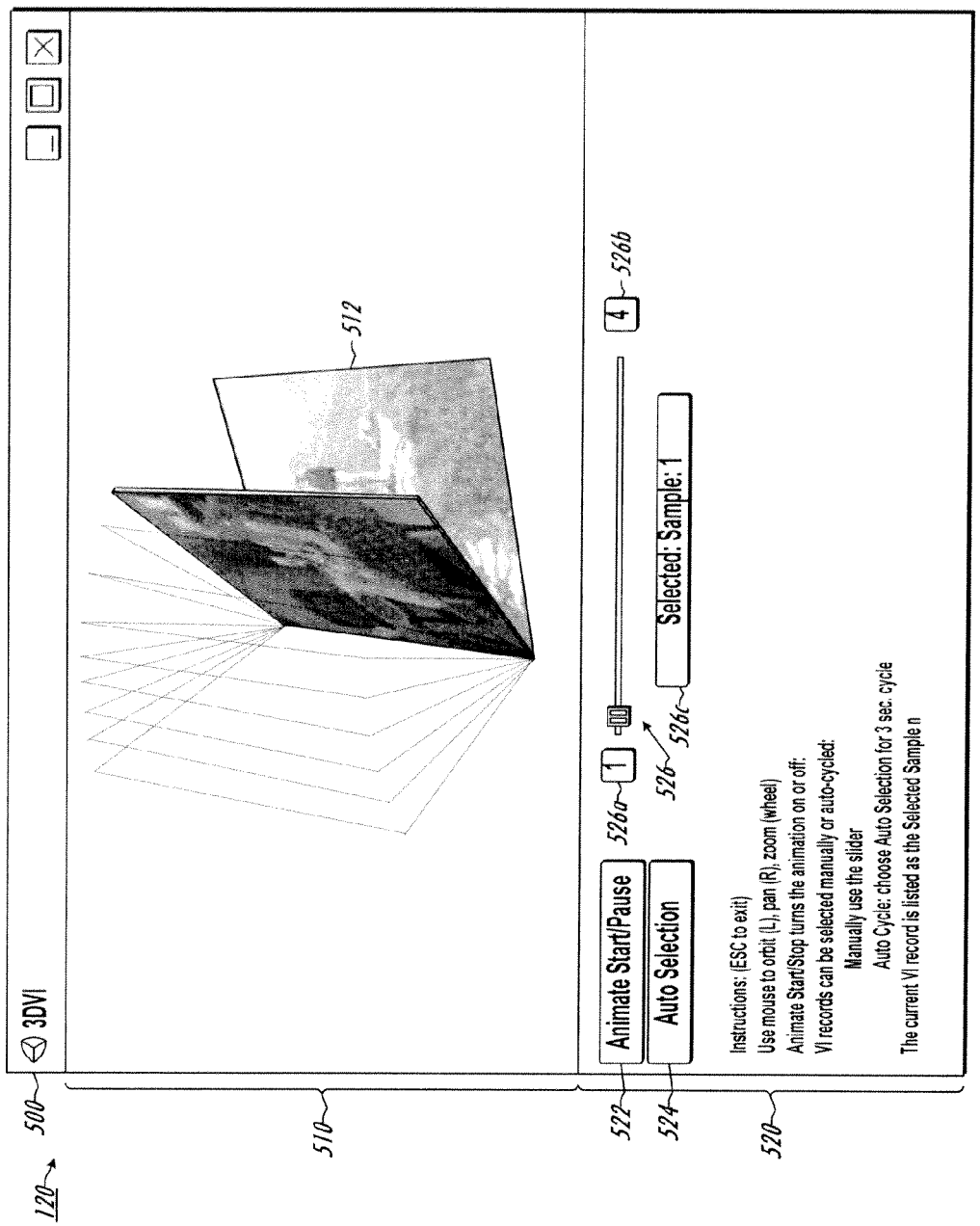
FIG. 4 illustrates the exemplary user interface displaying a 3-D animation of the foldable greeting card structural document of FIG. 3 according to the first record of the variable information print job file.

Referring also to FIG. 4, the system 122, 132, 322 can be used to render an animation of the same printed structural document by way of a series of image views 512 (shown in phantom in the figure) by which the user can see how the card will look when received by the recipient. In this regard, a third graphical image is shown on the front of the card, as seen in FIG. 3.

Figure 5:
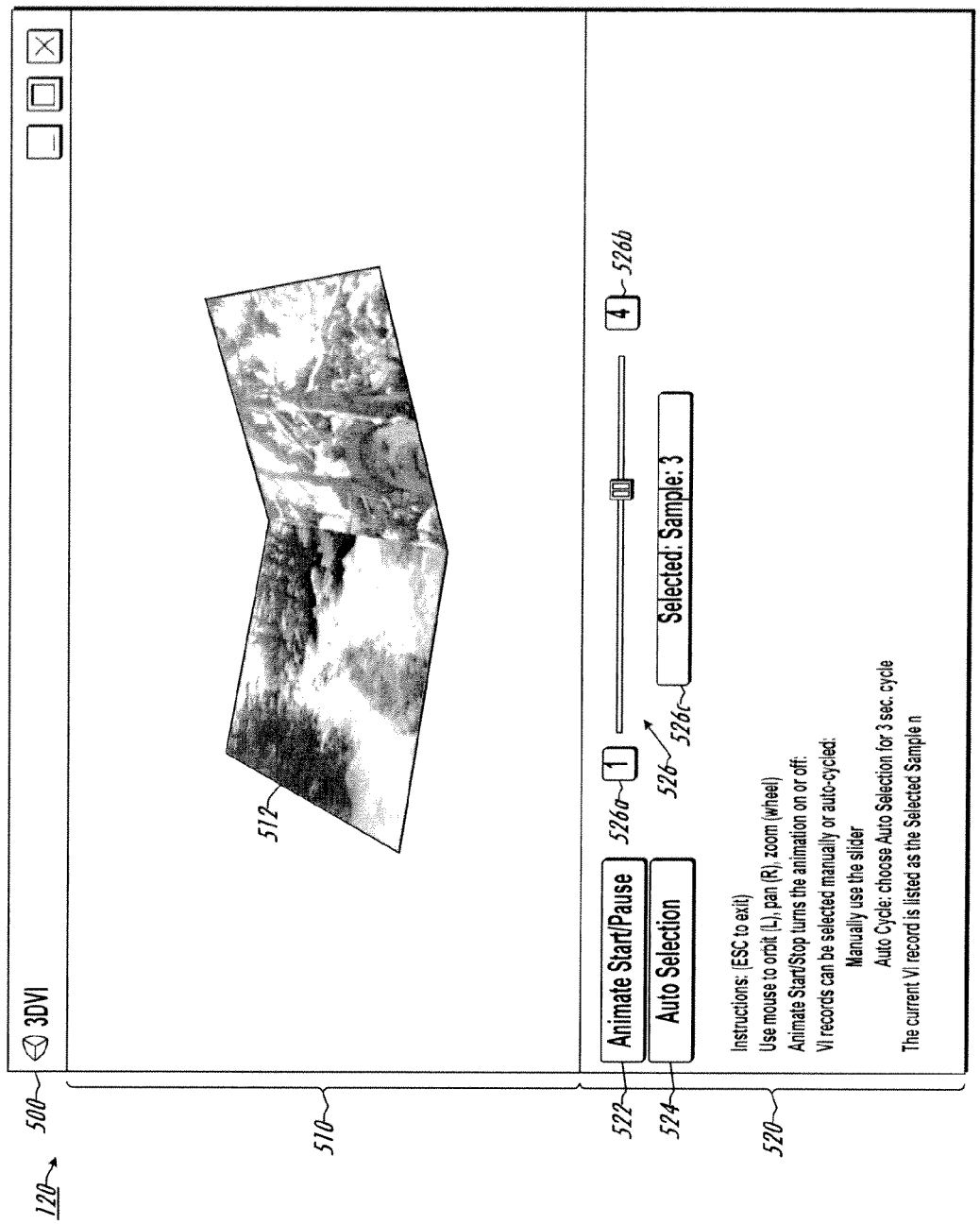
FIG. 5 illustrates the user interface displaying another exemplary foldable greeting card type 3-D structural document with images particularized according to a fourth record of the variable information print job file.

FIG. 5 illustrates a partially open image view 512 of the third record 152 in the exemplary variable information print job file 150, in which different photographic images 157 are provided on the two inner sides of the card structure. In this regard, the first and third cards of the job file 150 (FIGS. 3-5) are of essentially the same size, with different images 157 and text 154 defined by the corresponding data records 152 of the print job file 150.

FIG. 6 illustrates the final image view 512 of the corresponding last data record 152 in the exemplary print job 150, which is again a foldable greeting card 3-D structural document. In this case, however, the text 154, shape 158 and size 159 of this last data record 152 differ from the earlier examples of FIGS. 3-5. In particular, the size, shape, text and graphics are tailored according to the recipient's name (e.g., "Marta Albert"), with different text 154 indicated on the back inner fold of the card structure, where the recipient's name affects the overall length of the card, and the card includes four fold lines.

Figure 7:
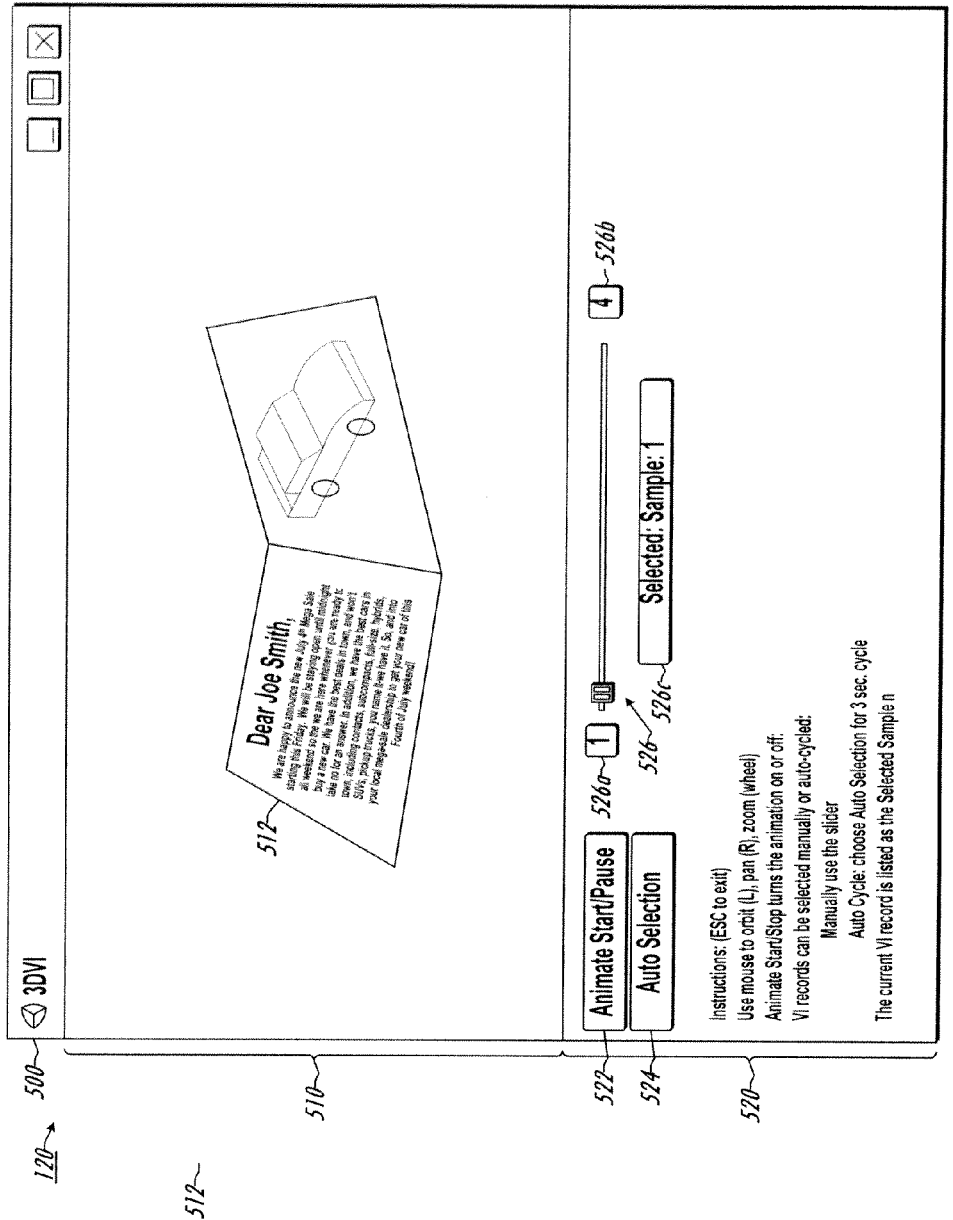
FIGS. 7-10 are simplified partial front elevation views illustrating the graphical user interface displaying images showing partially folded advertisement structural documents corresponding to four different records of a variable information print job file specifying common text as well as recipient-specific addressee text and product images.
Figure 8:
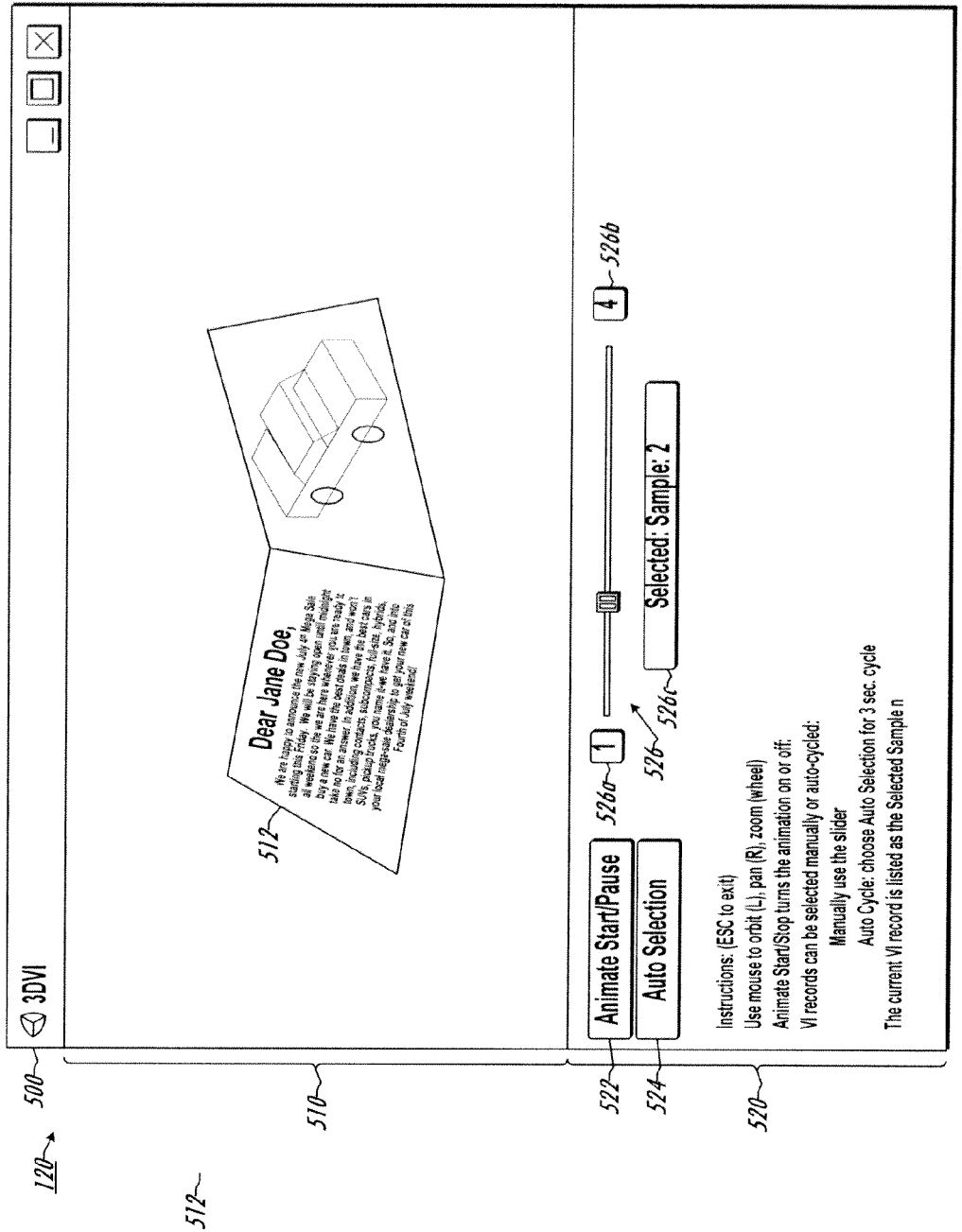
Figure 9:
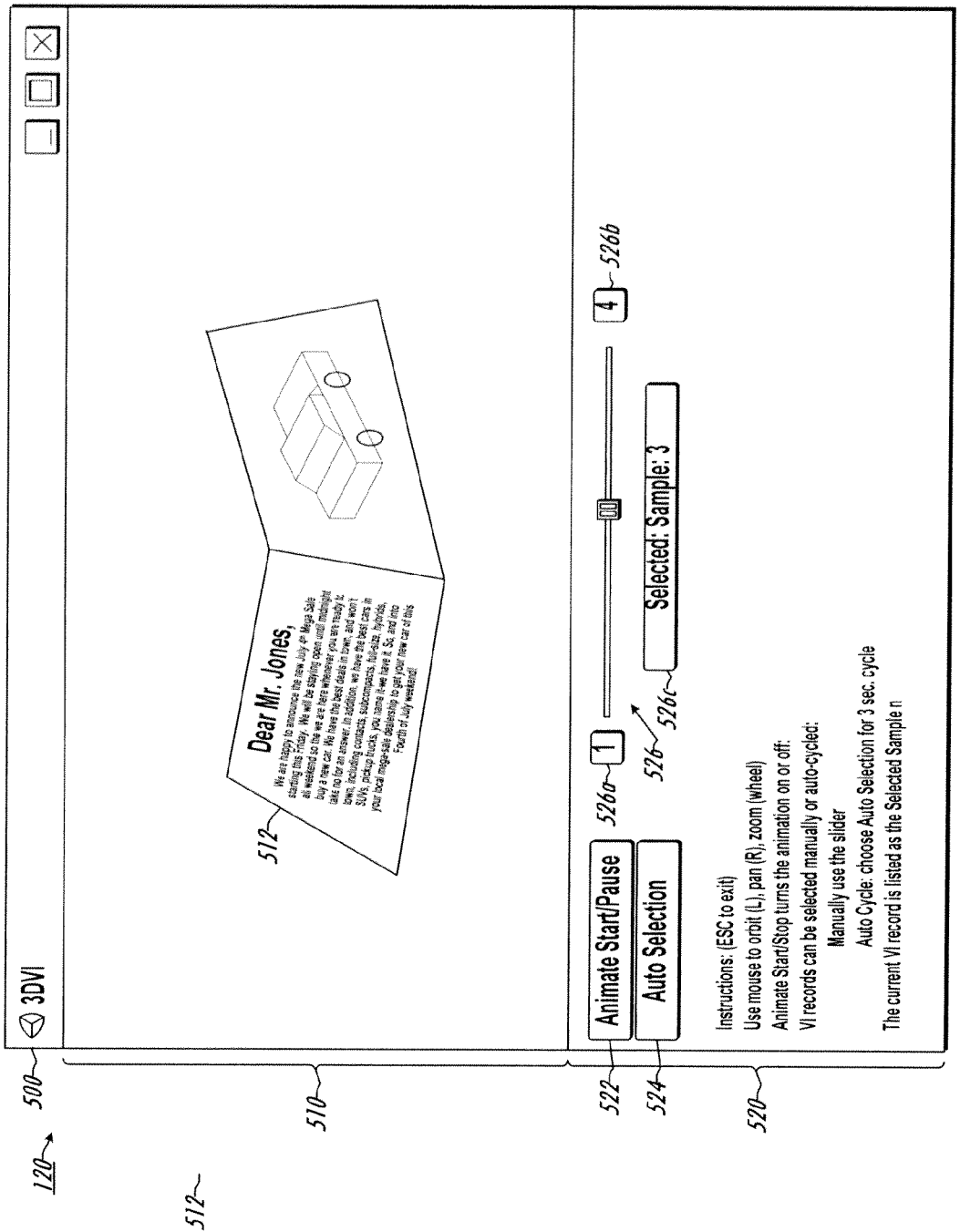
Figure 10:
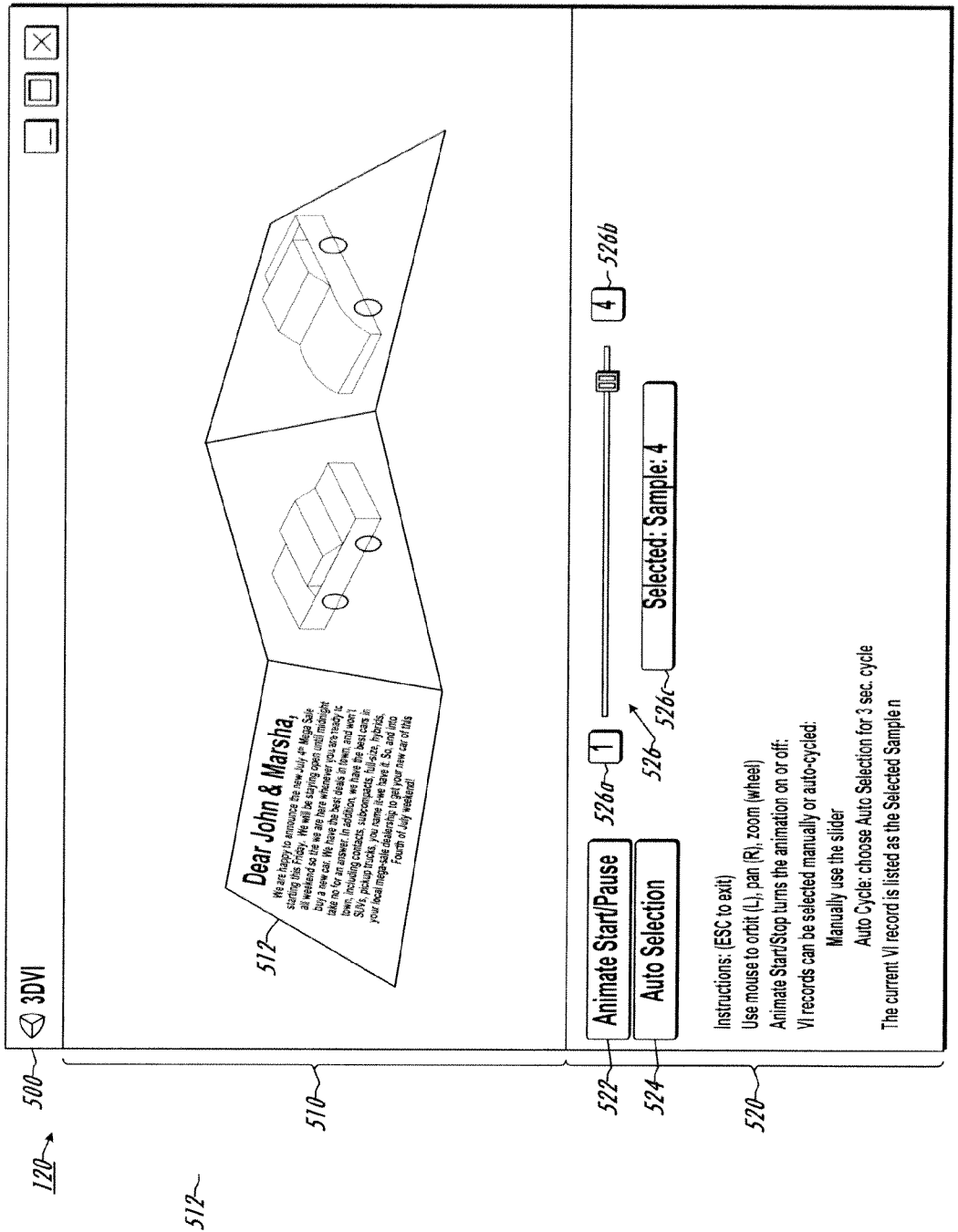

FIGS. 7-10 illustrate the user interface 500 displaying images showing partially folded advertisement structural documents corresponding to different records 152 of another exemplary variable information print job file 150. In this case, the specified addressee name text 154 is particularized to a specific recipient, as are product images 157 included within the content of the structural documents to be produced. In this regard, FIG. 7 illustrates an advertisement intended to be mailed to Joe Smith, including a first inner fold text portion addressing the recipient by name along with further text announcing a sales promotion for a car dealer, as well as a picture of a vehicle on the other inner fold of the structural document. The image 157 of the vehicle shown in the advertisement of FIG. 7 is defined by the corresponding data record 152 to show a vehicle that is believed to be of interest to the recipient Joe Smith. FIG. 8 illustrates a second sample of the print job, this time intended for another recipient Jane Doe. This structure also includes the same text announcing the sales promotion, but the right-hand side inner fold shows a picture of a different vehicle that is believed to be of interest to Jane Doe. FIG. 9 shows the next sample of this variable information print job, which is intended for mailing to Mr. Jones, and further includes a picture of yet another vehicle type believed to be of interest to Mr. Jones. The final sample in this example is shown in FIG. 10, in this case destined for mailing to a married couple John and Marsha, with text addressing John and Marsha by name, followed by the common text announcing the sales promotion. This structural document, however, includes two fold lines defining image areas for images showing two separate vehicles, one of which is believed by the sender to be of interest to recipient John and the other is believed to be of interest to recipient Marsha. As seen in this example, the system 122, 132, 322 allows the user to easily preview a potentially large number of structural document and/or package images 512 corresponding to data records 152 of a variable information print job file 150 in order to assess whether or not the perspective produced structural documents/packages will be as intended. This allows the user to make an informed decision on whether to adjust the print job file 150 or to forward the print job 150 to a production facility 400 to produce the actual printed articles 402.

Figure 11:
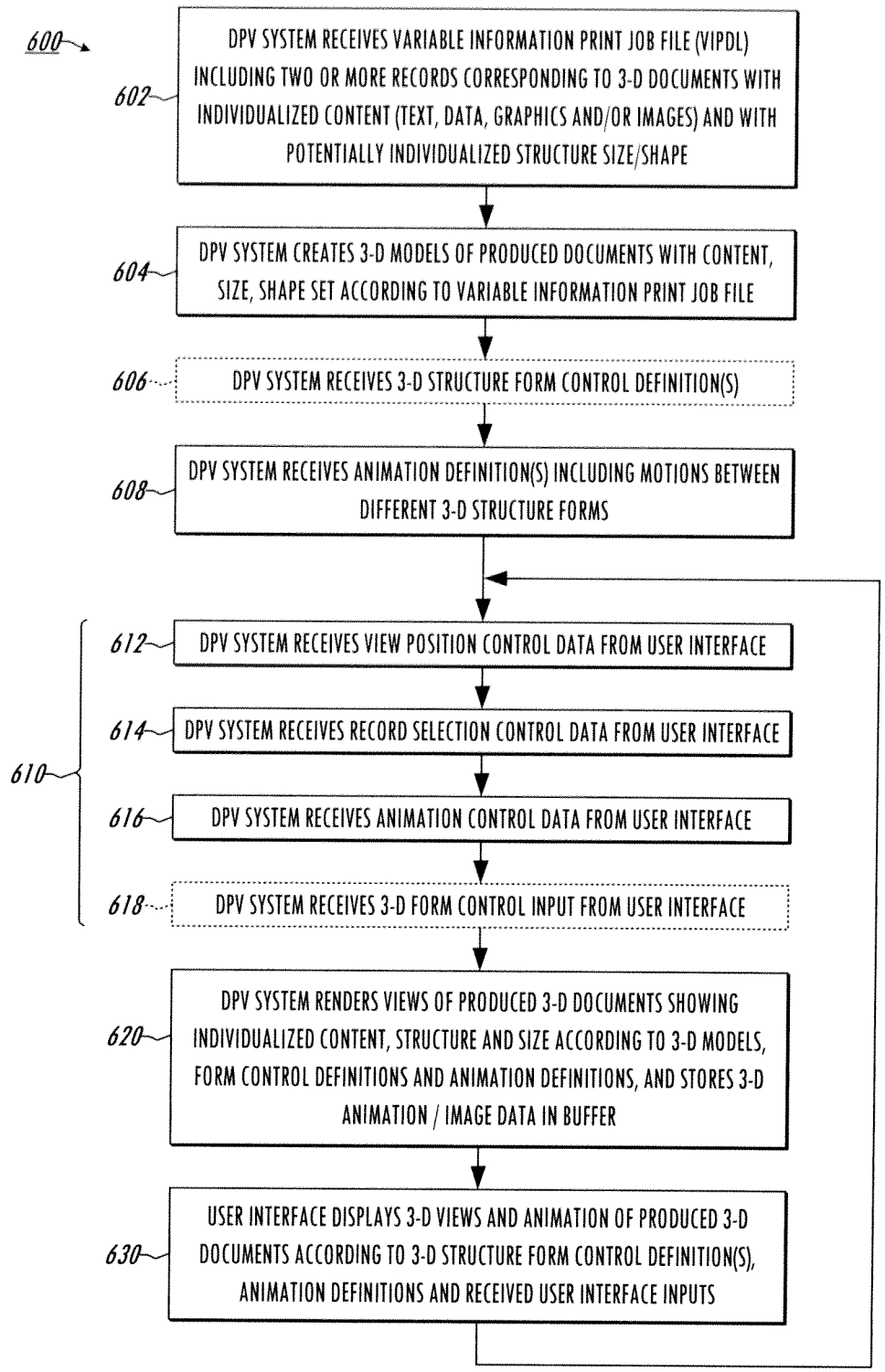
FIG. 11 is a flow diagram illustrating an exemplary method of previewing 3-D images of produced 3-D variable information structural documents or packages in accordance with further aspects of the present disclosure.

FIG. 11 illustrates an exemplary method 600 for previewing 3-D images 512 of produced 3-D variable information structural documents or packages in accordance with the present disclosure. The method 600 may be implemented in a computer program product that may be executed on a computer, such as a non-transitory tangible computer-readable recording medium on which a control program is recorded, such as a disk, hard drive, or the like. Common forms of tangible computer-readable media include without limitation floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other medium from which a computer can read and use. The exemplary method 600, moreover, may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device or devices capable of implementing a finite state machine that is in turn capable of implementing the flow diagram shown in FIG. 11, can be used to implement the method for previewing 3-D images 512 of produced 3-D variable information structural document or packages.

The method 600 begins at 602 where the DPV system receives a variable information print job file (e.g., file 150 shown in FIG. 2 above), where the file 150 includes two or more records 152 corresponding to 3-D documents with individualized content (text, data, graphics and/or images). Moreover, one or more of the data records 152 of the print job file 150 may include potentially individualized structure size and/or shape information (e.g., shape 158, size 159 in FIG. 2 above). At 604, 3-D models 163 of a plurality of produced 3-D structural documents or packages are created at least partially according to the print job file 150, and one or more 3-D structure form control definitions 538 may optionally be received at 606. At 608, animation definitions are received which include motions between different 3-D structure forms (e.g., definitions 169 in FIG. 2 above), and at 610 one or more inputs (e.g., signals and/or values) are received, for instance, from a user interface 500 associated with the DPV system 122, 132 and/or 322, or from a separate user interface 500. In particular, one or more view position control inputs are received at 612, one or more records selection control inputs are received at 614, one or more animation control inputs are received at 616, and one or more 3-D form control inputs are received at 618 in the example of FIG. 11, any of which can be one or more signals and/or values. At 620, image views are rendered of produced 3-D documents showing individualized content, structure and/or size according to 3-D models, form control definitions and/or animation definitions, and the rendered views 512 are stored as animation/image data 168 in a buffer (e.g., buffer 166 above). At 630, these are provided to the user interface 500, which displays 3-D views and/or animation of produced 3-D documents according to the 3-D structure form control definitions, animation definitions and/or received user interface and inputs.

The above systems and techniques can be employed in conjunction with applications allowing the user to vary design elements (e.g., graphics, text, images, etc.) relative to a fixed or constant structural design, and which may provide the user with the ability to vary one or more dimensions or features of a structural design for a document or package, with the above disclosed features allowing the ability to easily produce and verify personalized dimensional items. In particular, the described systems 122, 132, 322 facilitate expedient preview and approval of variable data content imposed upon finished 3-D structural documents or packages, particularly where the variable information content set forth in a print job file 150 causes changes in the 3-D structure. These techniques and systems thus provide a significant advance over existing systems that only allow preview of a single fixed structural piece within a single record 152 of content, or those that only allow viewing of single flat printed articles.

By using these systems and methods, the user can easily preview finished graphical content for multiple records of a variable data job in conjunction with the possibility of animations showing fold-down (e.g., printed flats), folding animations (e.g., bending and animated construction of documents or packages), opening/closing, etc. Furthermore, animations can be paused and adjusted by the user in order to ascertain the correctness of the variable information job by viewing various stages of folding at user-adjustable view positions, with the user being provided with independent control of these operations. Moreover, the rendering component 164 and/or the buffer 166 operate according to one or more user control inputs 532, 534, 536 and/or 538 with the generated models 163 and produced image views 512 automatically changing in response.

The described systems and methods thus facilitate ease of previewing a complete or partial set of resulting printed articles through a 3-D viewing system that utilizes the different records 152 of variable information data described in the print job file 150. The attributes of the produced articles as dictated by the data records 152 associated with each individual piece, including simple aspects of the resulting structure such as size scaling, cut lines around objects, etc. are easily accommodated by the system 122, 132, 322, and parametric structural definitions can be incorporated via the data records 152 to yield uniquely sized structure for each record 152, with the above described preview systems and methods providing the user with the ability to verify such variation in finished products by quickly iterating through the variable information records 152 along with the ability to simultaneously manipulate other aspects of the viewing scenario, such as view position control 532, 3-D form control 538, animation control 536, etc.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The following is claimed:

1. A system for previewing 3-D images of produced 3-D variable information structural documents or packages, comprising:
   at least one processor;
   a memory operatively coupled with the at least one processor and storing 3-D models of a plurality of produced 3-D structural documents or packages individually comprising at least one of text, data, graphics, and images defined by a corresponding plurality of data records of a variable information print job file;
   a buffer operative to store image data received from the at least one processor and to provide stored image data to a user interface; and
   a rendering component implemented using the at least one processor and operative to render image views of the 3-D models individually representing at least some of the plurality of produced 3-D structural documents or packages and to store the plurality of image views in the buffer;
   wherein the rendering component is operative to render two or more image views of a given 3-D model representing a corresponding given produced 3-D structural document or package according to a corresponding given data record of the variable information print job file, the two or more image views representing different 3-D forms of the corresponding given produced 3-D structural document or package;
   wherein the buffer is operative to provide the stored image data to the user interface including the two or more image views as an animation showing a shape or configuration change of the 3-D form of the given produced 3-D structural document during the animation;
   wherein at least one of the provision of stored image data to the user interface and the rendering of image views of the 3-D models is done at least partially according to at least one record selection control signal or value.

2. The system of claim 1, comprising a 3-D model generation component implemented using the at least one processor and operative to receive the variable information print job file and to generate the 3-D models of the plurality of produced 3-D structural documents or packages based at least in part on the variable information print job file.

3. The system of claim 1, wherein the buffer is operative to provide the stored image data to the user interface as a plurality of image views according to the at least one record selection control signal or value.

4. The system of claim 3, wherein the at least one record selection control signal or value is received from the user interface, wherein the at least one record selection control signal or value identifies a specific data record of the variable information print job file, and wherein the buffer is operative to provide the image views identified by the at least one record selection control signal or value to the user interface.

5. The system of claim 3, wherein the at least one record selection control signal or value is received from the user interface, wherein the at least one record selection control signal or value indicates an increment command or a decrement command, and wherein the buffer is operative to provide the image views corresponding to each data record of the variable information print job file in sequence to the user interface according to the at least one record selection control signal or value.

6. The system of claim 3, wherein the rendering component is operative to render the image views of the 3-D models from the perspective of a view position determined at least partially according to at least one view position control signal or value received from the user interface.

7. The system of claim 3, wherein the rendering component is operative to render the image views representing a given 3-D form of the produced 3-D structural document or package, and wherein the given 3-D form is determined according to at least one 3-D form control signal or value.

8. The system of claim 1, wherein the rendering component is operative to render the two or more image views of the given 3-D model at least partially according to an animation control signal or value received from the user interface.

9. The system claim of 8, wherein the animation control signal or value received from the user interface is one of i) a set a range control signal or value, ii) a start control signal or value, iii) a stop control signal or value, iv) a pause control signal or value, v) a reverse control signal or value and vi) a repeat control signal or value.

10. The system of claim, 1 wherein the given 3-D model is determined according to the at least one record selection control signal or value.

11. The system of claim 1, wherein the rendering component is operative to render the image views of the 3-D models from the perspective of a view position determined at least partially according to at least one view position control signal or value received from the user interface.

12. The system of claim 1, comprising the user interface.

13. A method for previewing 3-D images of produced 3-D variable information structural documents or packages, the method comprising:
   receiving a variable information print job file having a plurality of data records defining at least one of text, data, graphics, and images for a plurality of 3-D structural documents or packages;
   creating 3-D models of a plurality of produced 3-D structural documents or packages at least partially according to the variable information print job file;
   receiving at least one record selection control signal or value;
   rendering two or more image views of a given one of the 3-D models individually representing a given produced 3-D document or package according to a corresponding given data record of the variable information print job file, the two or more image views representing different 3-D forms of the corresponding given produced 3-D structural document or package;
   storing the image views in a buffer; and
   providing stored image data from the buffer to a user interface, wherein the stored image data from the buffer to the user interface includes the two or more image views as an animation showing a shape or configuration change of the 3-D form of the given produced 3-D structural document during the animation;
   wherein at least one of the rendering and the providing is done at least partially according to the at least one record selection control signal or value.

14. The method of claim 13, comprising receiving the at least one record selection control signal or value from the user interface, wherein the at least one record selection control signal or value identifies a specific data record of the variable information print job file, wherein providing the stored image data from the buffer to the user interface comprises providing image views identified by the at least one record selection control signal or value to the user interface.

15. The method of claim 13, comprising:
   receiving at least one view position control signal or value; and
   rendering the image views of the 3-D models from the perspective of a view position determined at least partially according to the at least one view position control signal or value.

16. The method of claim 13, comprising:
   receiving at least one 3-D form control signal or value; and
   rendering the image views representing a given 3-D form of the produced 3-D document determined according to the at least one 3-D form control signal or value.

17. The method of claim 13, comprising:
   rendering two or more image views of the given 3-D model at least partially according to an animation control signal or value received from the user interface.

18. The method of claim 17, wherein the animation control signal or value input received from the user interface is one of i) a set a range control signal or value, ii) a start control signal or value, iii) a stop control signal or value, iv) a pause control signal or value, v) a reverse control signal or value and vi) a repeat control signal or value.

19. The method of claim 13, comprising:
   rendering the image views of the 3-D models from the perspective of a view position determined at least partially according to at least one view position control signal or value received from the user interface.

20. A non-transitory computer-readable medium with the computer-executable instructions for previewing 3-D images of produced 3-D variable information structural documents or packages, the computer-readable medium comprising computer-executable instructions for:
   receiving a variable information print job file having a plurality of data records defining at least one of text, data, graphics, and images for a plurality of 3-D structural documents or packages;
   creating 3-D models of a plurality of produced 3-D structural documents or packages at least partially according to the variable information print job file;
   receiving at least one record selection control signal or value;
   rendering two or more mage views of a given one of the 3-D models individually representing a corresponding given 3-D document or package according to a corresponding given data record of the variable information print job file, the two or more image views representing different 3-D forms of the corresponding given produced 3-D structural document or package;
   storing the image views in a buffer; and
   providing stored image data from the buffer to a user interface;
   wherein the stored image data from the buffer to the user interface includes the two or more image views as an animation showing a shape or configuration change of the 3-D form of the given produced 3-D structural document during the animation;
   wherein at least one of the rendering and the providing is done at least partially according to the at least one record selection control signal or value.

* * * * *

UNITED STATES PATENT AND TRADEMARK OFFICE
CERTIFICATE OF CORRECTION

| | | |
|---|---|---|
| PATENT NO. | : 8,773,428 B2 | Page 1 of 1 |
| APPLICATION NO. | : 13/155645 | |
| DATED | : July 8, 2014 | |
| INVENTOR(S) | : Robert John Rolleston et al. | |

It is certified that error appears in the above-identified patent and that said Letters Patent is hereby corrected as shown below:

ON THE TITLE PAGE

Item (76) should read Item (75)

Insert Item (73) --Assignee: Xerox Corporation, Norwalk, CT (US)--

Signed and Sealed this
First Day of December, 2015

Michelle K. Lee
*Director of the United States Patent and Trademark Office*